Patented Oct. 4, 1938

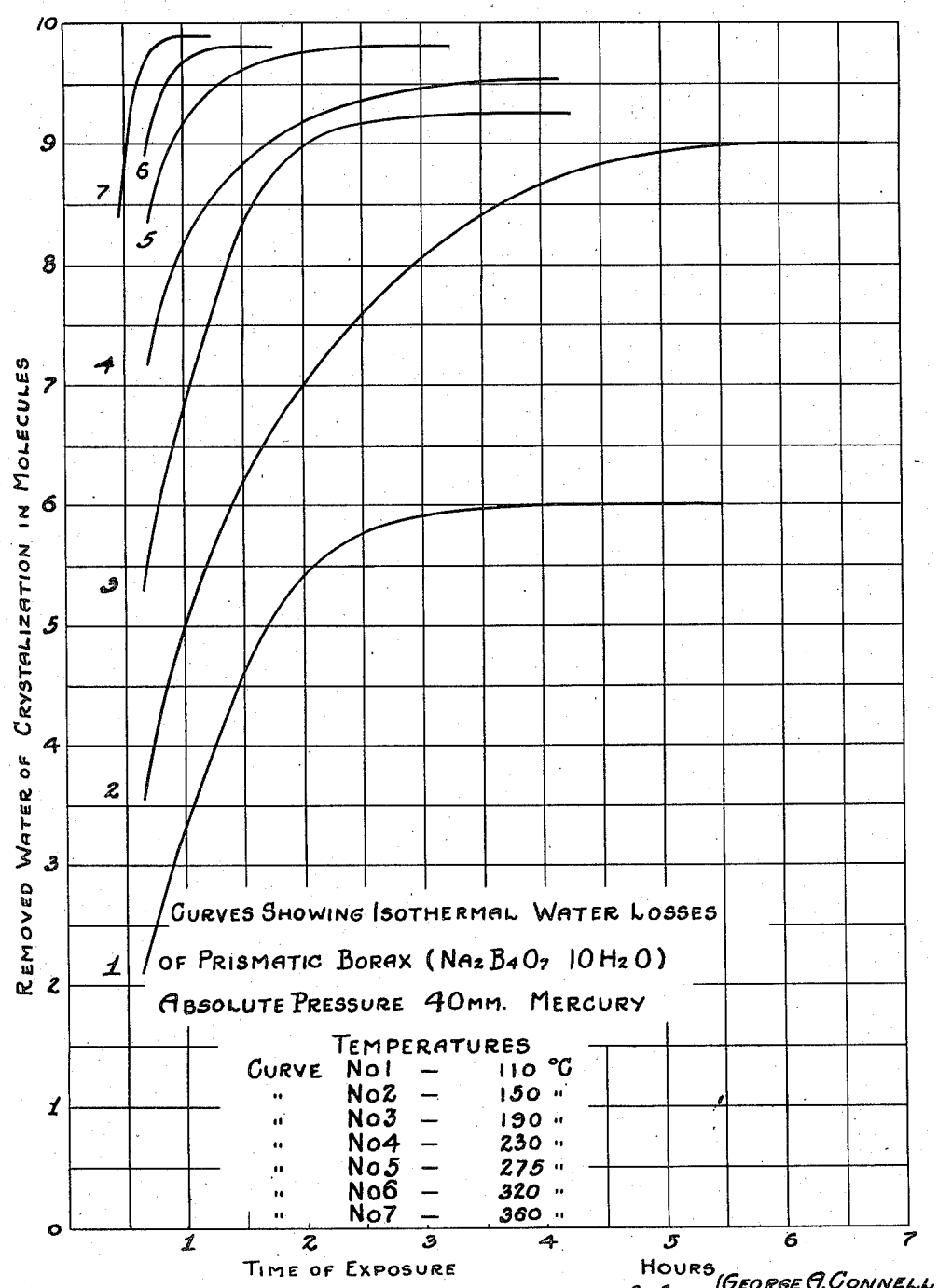

2,131,793

UNITED STATES PATENT OFFICE 2,131,793

GRANULAR NONVITREOUS DESICCATED BORAX

Thomas M. Cramer, Long Beach, and George A. Connell, Wilmington, Calif., assignors to Pacific Coast Borax Company, a corporation of Nevada Application July 23, 1928, Serial No. 294,936

10 Claims. (Cl. 23—59)

Commercial borax or sodium bi-borate ($Na_2B_4O_7$) is marketed in both the prismatic or hydrated form, and in the anhydrous form. The former is identified by the formula $Na_2B_4O_7.10H_2O$, having ten molecules of water of crystallization or combination and the latter form which finds wide application in the metallurgical and other arts in which the presence of water is a detriment, is commonly manufactured and sold as borax glass and calcined borax, depending upon the manner in which the combined water has been removed.

In the manufacture of borax glass, which is also identified as the vitreous form of borax, water of crystallization or combination is expelled by a free flame. The dehydration is accompanied, by a swelling of the heated mass and then a final reduction to melted anhydrous borax at a temperature above 740° C. The melted glass is allowed to cool and is then reduced by grinding to a granular or powdered form.

The industrial application of anhydrous borax glass almost always involves heating it, mixed with other materials, to a sintered or fused condition and the advantage of the borax glass in such mixtures over prismatic borax resides in the absence of water which would cause a swelling of the melt and the release of water or water vapor in the crucible or furnace.

Borax glass has certain properties which restrict its wider use in the arts. First: It is produced at high heat, and when melted has a corrosive action on the lining of the furnace, dissolving thereby a part of the brick forming the hearth. This results in a glass which may contain as high as 2% impurities as alumina, silica, etc. Second: Due to its vitreous nature and dense structure, the borax glass resists solution in water, and even when finely divided may be described as slowly soluble. Third: It is abrasive in character and wears any metallic parts of machinery with which it may be handled for conveying, grinding or mixing.

To overcome the disadvantages above mentioned, it has been known that borax could be "calcined". This consists in heating to a temperature at which the crystal particle swells and most of the water of crystallization or combination is expelled, but the process of production must be carefully controlled or incipient fusion takes place and the purpose is defeated. Extensive equipment is required for small production, and the product is bulky, due to the swelling of the mass caused by the expulsion of water at a comparatively high heat.

It is therefore an object of this invention to produce a product, which for the purposes of description, may be termed "granular non-vitreous desiccated borax" and defined as a borax heated to a temperature below the melting temperature of anhydrous borax and so treated that no swelling of the particles has taken place during the removal of the water. The product is of pleasing appearance as to texture and color. The individual particles are similar in form to the original hydrated or prismatic borax and when discharged from the desiccating apparatus, have no greater volume than the borax from which they are produced. It can be made as pure as the original borax will allow, there being no contamination from the producing machinery, it is of non-abrasive nature and is quickly soluble in both cold and hot water.

It is a further object of this invention to produce a process whereby the above defined product may be obtained; such process being variable to yield a desiccated borax of any predetermined water content.

In the desiccation of prismatic borax, half of the water of crystallization (five molecules) is released at the comparatively low temperature of 60° C. or less and in the ordinary process of heating borax in a hearth or crucible, this released water dissolves part of the borax, making a solution. The granular form of the borax is thus completely destroyed, and further dehydration consists to a considerable extent in driving off the water from a solution. Another object of this invention is therefore the elimination of the water of crystallization without this redissolving action, which is accomplished by heating the borax in a vessel under reduced vapor pressure, the pressure conditions being such that the released water is removed from the desiccating chamber immediately upon its release.

In practicing the so-called vacuum process the procedure followed includes the heating of hydrated borax, preferably in a granular state, in a container in which the pressure is maintained below atmospheric. The details of the commercial application of the process may be varied somewhat to suit the nature of the equipment available and the exact product desired. Desiccation may be accomplished while the borax lies still in the container or the borax may be slowly turned over or agitated. An important part of the process is that the dehydration should be carried to the desired point without interruption of vacuum or heat application, and the pressure conditions are maintained such that the temperature will be below the melting or fusing temperature of the dehydrated borax (about 740° C.).

It will be understood that the individual particles of the product formed in this process have substantially the same shape and form as the individual particles of the original hydrated borax. The weight of a unit volume of the original borax is however lessened in an amount equal to the quantity of water removed, and the product might be defined as having a unit volume weight substantially equal to a unit volume weight figure which might be calculated by subtracting from the unit volume weight of the original hydrated borax, the weight of the water which is removed in the process of desiccation. It will be understood however, that the product may be ground or compressed to increase its unit volume weight, for convenience or economy in storage and transportation.

The chart shown in the accompanying drawing presents a series of isothermal curves obtained by heating prismatic borax to various temperatures under a vacuum of about 720 m. m. (40 m. m. mercury absolute pressure), and noting the loss in water of crystallization over various periods of exposure. Each curve is an isotherm, and the temperatures under which they were obtained are as follows: No. 1, 110° C.; No. 2, 150° C.; No. 3, 190° C.; No. 4, 230° C.; No. 5, 275° C.; No. 6, 320° C.; No. 7, 360° C. All of the curves should be considered as originating at "0", and "10" on the ordinate designates the completely anhydrous state, since prismatic borax contains ten molecules of water of crystallization or combination.

It will be apparent from these curves that the degree of desiccation can be regulated as desired by the intensity of heat used and the length of time in which the borax is exposed to the heat.

Curve No. 7 may be considered as indicative of a preferred set of conditions under which commercially anhydrous borax may be produced, such conditions comprising heating the hydrated borax, to a temperature of substantially 360° C. under an absolute pressure of substantially 40 m. m. of mercury for from one to two hours.

The process is however not limited to the production of commercially anhydrous borax (which may for descriptive purposes be defined as borax containing anhydrous borax in excess of 98%) but may be used in the desiccation of borax to any predetermined degree short of complete dehydration, and the invention is not to be considered as being confined to the example outlined above, but to include such changes as may fairly come within the spirit of the appended claims.

We claim as our invention:

1. An article of manufacture comprising desiccated borax produced from hydrated borax in which the individual particles of said desiccated borax are similar in form and size to the original hydrated borax but have a unit volume weight less than that of the original hydrated borax.

2. An article of manufacture comprising desiccated borax having a unit volume weight substantially equal to the unit volume weight calculated by subtracting from the unit volume weight of hydrated borax, the weight of the water removed in the production of said desiccated borax.

3. An article of manufacture comprising desiccated borax in which the individual particles are similar in form and size to the individual particles of hydrated borax, and which is readily soluble in hot and cold water.

4. A process for producing desiccated borax which includes heating hydrated borax to a temperature of substantially 360° C. in an atmosphere where all of the moisture expelled from the borax by the heat is continuously removed from the space surrounding the borax.

5. An article of manufacture comprising desiccated borax in which the individual particles are similar in form to the individual particles of hydrated borax and which is substantially free from puffed materials.

6. An article of manufacture consisting of borax having between 8 and 21% remaining water of crystallization, the particles of said borax being of granular form, of essentially the same shape and of a size not essentially greater than that of the original borax material, and possessing a high apparent density.

7. A new article of manufacture consisting of borax having between 8 and 21% remaining water of crystallization, the particles of said borax being granular in form, of essentially the same shape and of a size not essentially greater than that of the original borax material, and being substantially free of borax glass.

8. A new article of manufacture consisting of calcined borax the particles of which are of granular form and of essentially the same shape and of a size not essentially greater than that of the original borax material, containing less than 21% water of crystallization, and containing a greater sodium tetraborate content per unit of volume than borax $Na_2B_4O_7.10H_2O$.

9. An article of manufacture comprising a friable nonvitreous sodium tetra borate containing anhydrous borax in excess of 98% and in which the individual particles are substantially free from puffed materials.

10. An article of manufacture comprising a friable sodium tetra borate containing anhydrous borax in excess of 98% and in which the individual particles are substantially free from puffed and vitreous materials.

THOMAS M. CRAMER.
GEORGE A. CONNELL.